(12) United States Patent
Lee

(10) Patent No.: US 7,702,099 B2
(45) Date of Patent: Apr. 20, 2010

(54) MULTIPOINT SYNCHRONOUS DIFFUSED ENCRYPTION/DECRYPTION METHOD

(76) Inventor: Chiou-Haun Lee, P.O. Box 36-80, Taichung City (TW)

( * ) Notice: Subject to any disclaimer, the term of this patent is extended or adjusted under 35 U.S.C. 154(b) by 1329 days.

(21) Appl. No.: 11/171,549

(22) Filed: Jun. 30, 2005

(65) Prior Publication Data
US 2007/0003060 A1    Jan. 4, 2007

(51) Int. Cl.
*H04L 9/28* (2006.01)
*H04K 1/00* (2006.01)
*G06F 17/00* (2006.01)

(52) U.S. Cl. .......................... 380/28; 708/401

(58) Field of Classification Search ............ 380/28–29, 380/37, 42, 259, 277; 708/400, 401, 490, 708/820
See application file for complete search history.

(56) References Cited

U.S. PATENT DOCUMENTS

| 6,578,150 B2 * | 6/2003 | Luyster | 380/37 |
| 7,450,720 B2 * | 11/2008 | Roelse | 380/259 |
| 2003/0174835 A1 * | 9/2003 | Yokota et al. | 380/28 |
| 2004/0202326 A1 * | 10/2004 | Chen et al. | 380/263 |

\* cited by examiner

*Primary Examiner*—Minh Dieu Nguyen

(57) ABSTRACT

A symmetric encryption/decryption method includes the steps of selecting a diffused mechanism, and the diffused mechanism includes at least one selected from a shift point, a block and a frame; obtaining a plurality of bits required for a cipher by the diffused mechanism and the element number of each dimension of a plaintext; carrying out at least one diffused operation for the plaintext; repeating the foregoing steps to achieve the effect of encrypting the plaintext. Since the sum of the encryption diffused times and the decryption diffused times equals to the diffused cycle, the cipher can be read and at least one dimensional diffused operation of the ciphertext can be carried out, and thus achieving the effect of decrypting the ciphertext.

13 Claims, 4 Drawing Sheets

MULTIPOINT SYNCHRONOUS DIFFUSED ENCRYPTION/DECRYPTION METHOD

BACKGROUND OF THE INVENTION

1. Field of the Invention

The present invention relates to a data encryption/decryption method, and more particularly to a data encryption/decryption method that uses basic disturbed operations including shift and exclusive or (XOR) and applies a multipoint synchronous diffused mechanism to achieve data encryption and decryption by a diffused cycle.

2. Description of the Related Art

A prior art data encryption/decryption method fully mixes a plaintext with a cipher to define a ciphertext by a series of operations including shift, XOR and transform, etc, and the ciphertext and cipher can decrypt the ciphertext back into the plaintext by the same algorithm. If other users do not have the original cipher, then they cannot decrypt the ciphertext. Thus, the present invention can achieve the effect of protecting confidential data.

In the prior arts, it is intentionally to produce a substantial irrelevance between the plaintext and the ciphertext. Basically, the plaintext and the cipher go through a one-dimensional matrix logical operation and a two-dimensional matrix transform, and the key point of the security resides on the repeated logical operations and transforms of the algorithm.

SUMMARY OF THE INVENTION

The inventor of the present invention based on years of experience in the related field to conduct extensive researches and experiments to improve the existing technology and finally invented the safer and more versatile multipoint synchronous diffused encryption/decryption method of the present invention.

TABLE 1

| Technical | Plaintext (bit) | cipher (bit) | Pre-processing (second) | encryption (second) | decryption (second) | code (line) |
|---|---|---|---|---|---|---|
| Present invention | 256 | 264 | 0 | 0.062 | 0.093 | 100 |
| AES | 128 | 176 | 6.3 | 0.094 | 0.109 | 125 |

It is a primary objective of the present invention to provide a multipoint synchronous diffused data computing to process at least one dimensional matrix logical operation (which is an n-dimensional space operation) so as to significantly reduce the operating time. By using the multipoint synchronous diffused mechanism to replace the conventional bit conversion table and use the multipoint to set up a synchronous processing, a major irrelevance between the plaintext and the ciphertext can be established in a very short time.

The technical measures taken by the present invention are described as follows:

A symmetric encryption/decryption method comprises the steps of:

(A) Selecting a diffused mechanism;

(B) Obtaining a plurality of bits required for the cipher according to the diffused mechanism and the element number of each dimension of the plaintext;

(C) Using the plurality of bits to carry out at least one dimensional diffused operation of the mechanism to the plaintext;

(D) Repeating the foregoing steps to transform the plaintext into a ciphertext, so as to achieve the effect of encrypting the plaintext.

Since the sum of encryption diffusion times and the decryption diffusion times equals to the diffusion cycle, the cipher can be read and at least one dimensional diffused operation of the ciphertext can be carried out, and thus achieving the effect of decrypting the ciphertext.

DETAILED DESCRIPTION OF THE PREFERRED EMBODIMENTS

Figure 1:
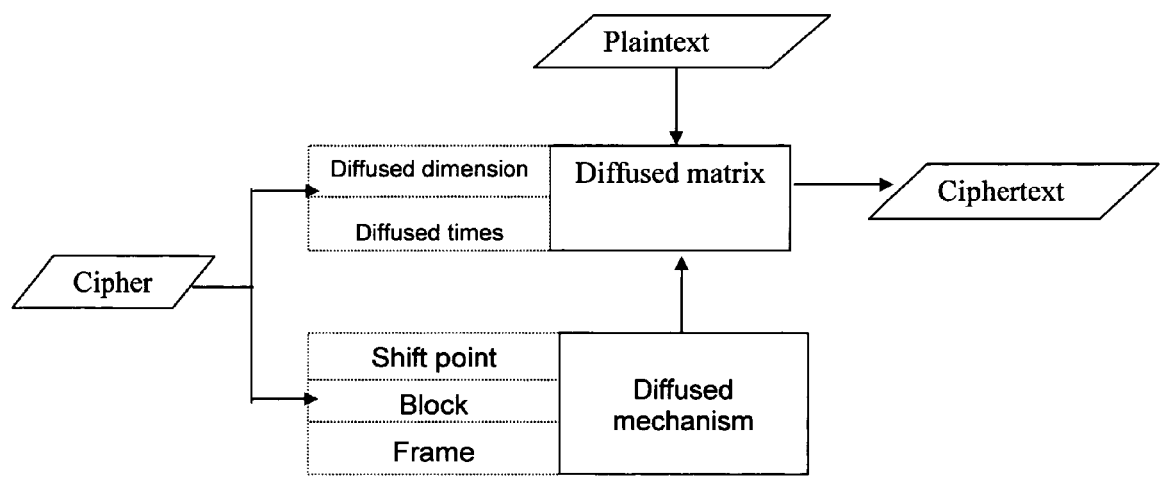
FIG. 1 is a flow chart of a multipoint synchronous distribution according to the present invention.

Referring to FIG. 1, a multipoint synchronous diffusion method makes use of a combination of a diffused mechanism to include at least one dimensional matrix to define a multipoint synchronous diffused operation, which comprises the following elements:

A diffused operation: For a diffused cycle, the value of the diffused area will return to its original value for every cycle of the diffused times, and thus the diffused operation is divided into a diffused status from the beginning to the end of a cycle or a status for returning from the end to the start before the diffusion.

A diffused status: It includes a diffused area, and the diffused area is neatly arranged with the same block size, and the diffused area includes a diffused start block, and such start block is used as a diffused center for the diffusion in a sequence outward, and a new value in the diffused area is produced. The original value at that position XOR with the diffused value transmitted from the adjacent diffused direction, and the new value is used as a diffused value for the diffusion outward. The process is continued until the entire diffused area is finished.

A status before diffusion: It includes a diffused area and the diffused area is neatly arranged with the same block size, and the diffused area includes a diffused start block, and such start block is used as a diffused center for the diffusion in a sequence inward, and a new value in the diffused area is produced. A new value produced at that position is performed by the original value XOR with the original value transmitted from the adjacent diffused direction inwardly. The process is continued until the entire diffused area is finished.

The diffused mechanism of a shift point: It includes a diffused area, and the diffused area includes a start point of diffusion, and the start point is used as a diffused center to carry out at least one dimensional diffused operation.

Symbols and definition of a shift point diffusion:

$A(i_1, i_2, \ldots i_n)$: It is an n-dimensional matrix diffused area A that uses Point $(i_1, i_2, \ldots i_n)$ as a start point to carry out an n-dimensional diffused operation.

$A(i_1, i_2^t, \ldots i_n)$: It is an n-dimensional matrix diffused area A that uses Point $(i_1, i_2, \ldots i_n)$ as a start point to repeat diffusion for t times.

Example:

$$A(i_1, i_2^2, \ldots i_n) = A(i_1, i_2, \ldots i_n)(i_1, i_2, \ldots i_n) \quad (a)$$

$$A(i_1, i_2^1, \ldots i_n) = A(i_1, i_2, \ldots i_n) \quad (b)$$

$$A(i_1, i_2^0, \ldots i_n) = A \quad (c)$$

A shift point diffused cycle:

$$A(i_1, i_2^t, \ldots i_n) = A$$

(a) A takes a dimension with the most number of elements (set to k).
(b) The new value and original value of a diffused start point are different, $t = 2 \times 2^{\lceil log_2 k \rceil}$.
(c) The new value and original value of a diffused start point are the same, $t = 2^{\lceil log_2 k \rceil}$.

Figure 2A:
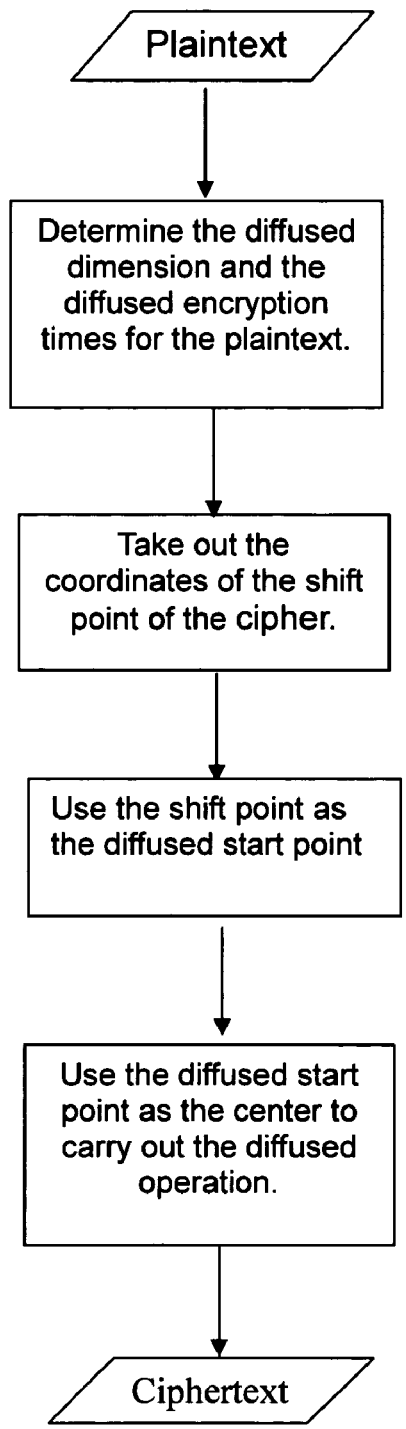
FIG. 2A is a flow chart of a shift point diffused encryption according to the present invention.

The flow chart of a shift point diffused encryption is shown in FIG. 2A.

Figure 2B:
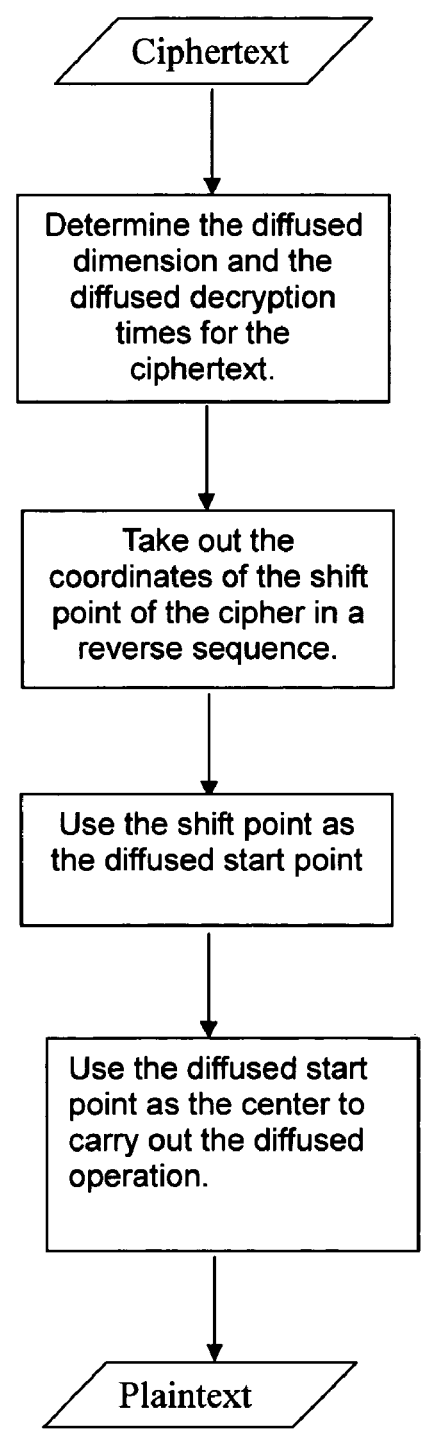
FIG. 2B is a flow chart of a shift point diffused decryption according to the present invention.

The flow chart of a shift point diffused decryption is shown in FIG. 2B.

The diffused mechanism of a block: It includes a diffused area, a block, and a fixing point in a block; the diffused area includes a diffused start block at the position of the block, and the diffused start block is the center, and the diffused area is neatly arranged with the block size, and the block size is used as the unit. The diffused start block is used at the center to carry out at least one dimensional diffused operation.

Symbols and definition of a block definition:

$S_{k_1 * k_2 * \ldots * k_n}$: It is an n-dimensional matrix block S, and the element number for each dimension is $k_1 k_2 \ldots k_n$.

$A(i_1, i_2, \ldots i_n)$: It is an n-dimensional matrix diffused area A that uses Point $(i_1, i_2, \ldots i_n)$ as an anchor point of a start block, and A is converted into size S with block as its unit for carrying out an n-dimensional diffused operation.

$A(i_1, i_2^t, \ldots i_n)$: It is an n-dimensional matrix diffused area A that uses Point $(i_1, i_2, \ldots i_n)$ as an anchor point of a start block to repeat the diffusion for t times.

block diffused cycle:

$$A(i_1, i_2^t, \ldots i_n) = A$$

(a) A and S take a dimension with the largest element number ratio (set to be k).
(b) The new value and original value of the diffused start block are different, $t = 2 \times 2^{\lceil log_2 k \rceil}$.
(c) The new value and original value of the diffused start block are the same, $t = 2^{\lceil log_2 k \rceil}$.

Figure 3A:
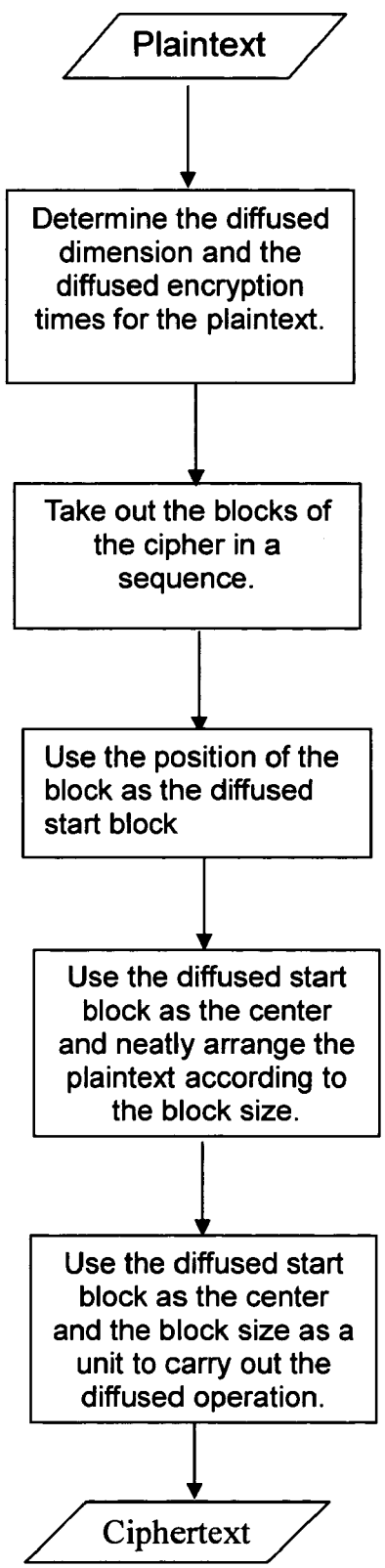
FIG. 3A is a flow chart of a block diffused encryption according to the present invention.
Figure 3B:
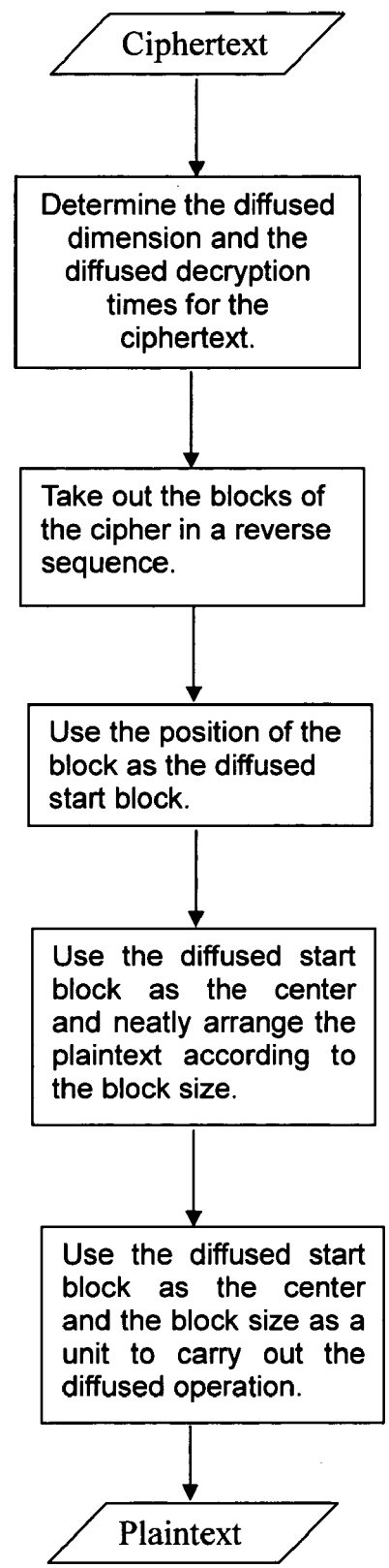
FIG. 3B is a flow chart of a block diffused decryption according to the present invention.

FIG. 3A shows a flow chart of a block diffused encryption.
FIG. 3B shows a flow chart of a block diffused decryption.

The diffused mechanism of a frame: It comprises a diffused area, a frame, a fixing point in the frame, and the edge corner end point is the start point of the diffusion. The diffused area is divided into a plurality of sub-areas being stacked on a fixing point of the frame, and each sub-area must include a diffused start point, and the plurality of diffused start points are the center. In the meantime, at least one dimensional diffused operation is carried out to be diffused to each diffused value XOR at the overlapped position.

Symbols and definition of a frame:

$W_{k_1 * k_2 * \ldots * k_m}$: It is an m-dimensional frame W. and the number of elements for each dimension is $k_1, k_2, \ldots k_m$.

$A(i_1, i_2, \ldots i_n)$: it is an n-dimensional matrix diffused area A, and the frame shift point is corresponsive to Point $(i_1, i_2, \ldots i_n)$, and the edge corner end point of a frame is used as a diffused start point of the diffused area to carry out an n-dimensional diffused operation.

$A(i_1, i_2^t, \ldots i_n)$: It is an n-dimensional matrix diffused area A, and the frame fixing point is corresponsive to Point $(i_1, i_2, \ldots i_n)$ to repeat diffusion for t times.

Frame diffused cycle:

$$A(i_1, i_2^t, \ldots i_n) = A$$

(a) A takes a sub-diffused area with the largest element number for a dimension (set to be K).
(b) The new value and the original value of the diffused start point are different, $t = 2 \times 2^{\lceil log_2 k \rceil}$.
(c) The new value and the original value of the diffused start point are the same, $t = 2^{\lceil log_2 k \rceil}$.

Figure 4A:
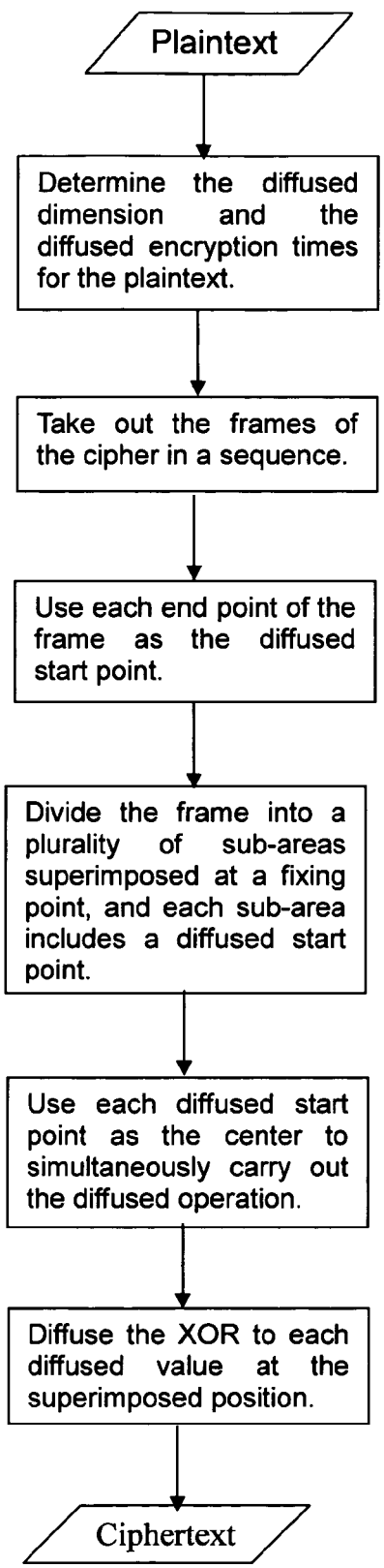
FIG. 4A is a flow chart of a frame diffused encryption according to the present invention.
Figure 4B:
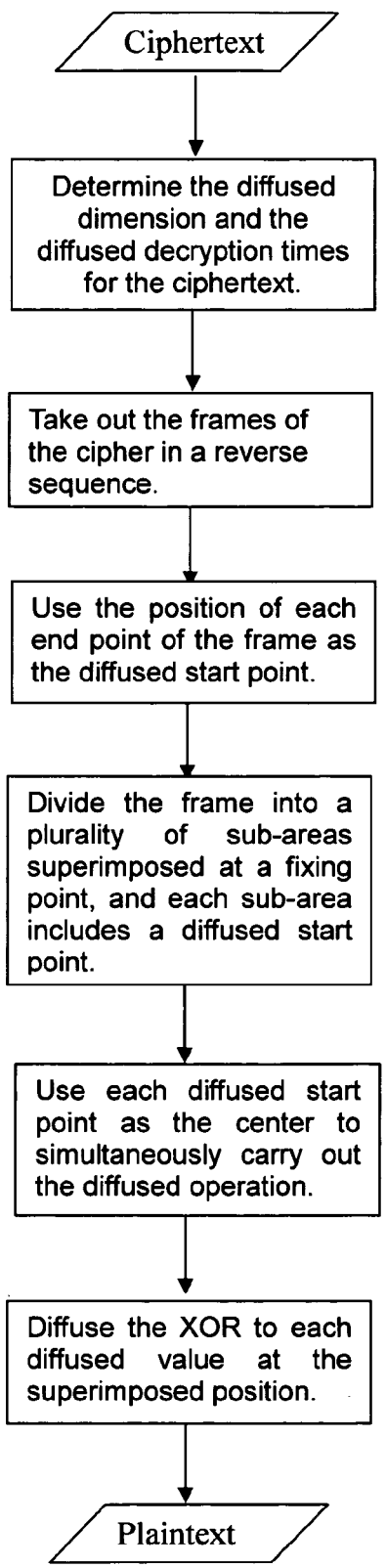
FIG. 4B is a flow chart of a frame diffused decryption according to the present invention.

FIG. 4A shows a flow chart of a frame diffused encryption.
FIG. 4B shows a flow chart of a frame diffused decryption.

Embodiment of Multipoint Synchronization

To make it easier for our examiner to understand the content of the present invention, the diffused operation, diffused mechanism, and diffusion dimension are described in details as follows:

Diffused operation: It comprises four diffused areas A, B, C and D which have the same block size with each other and neatly arranged; where A is the diffused start block, T is a trigger signal, and their operations are shown in Table 2.

TABLE 2

| Diffused Area | | Diffused Status | | Status before Diffusion | |
|---|---|---|---|---|---|
| C | D | i. $A = A \oplus T$ | i. | $D = B \oplus C \oplus D$ | |
|   |   | ii. $B = A \oplus B$ | ii. | $C = A \oplus C$ | |
| A | B | iii. $C = A \oplus C$ | iii. | $B = A \oplus B$ | |
|   |   | iv. $D = B \oplus C \oplus D$ | iv. | $A = A \oplus T$ | |

$\oplus$: XOR

Example 1

Shift Point+Block+Two-Dimensional Matrix

A plaintext takes an 8×8 two-dimensional matrix.

A block takes a 2×2 two-dimensional matrix and a fixing point takes the coordinates (row, column) of a two-dimensional matrix.

A shift point takes the coordinates (row, column) of a two-dimensional matrix.

A diffused encryption frequency is in terms of a number of times.

Initialization:

Tale a plaintext: Taking "smoother" for example, its ASCII code is 73 6D 6F 6F 74 68 65 72, which can be represented by a binary system to form an 8×8 two-dimensional matrix as shown in Table 3-1.

TABLE 3-1

| ASCII | | | | | | | |
|---|---|---|---|---|---|---|---|
| 73 | 6D | 6F | 6F | 74 | 68 | 65 | 72 |
| 1 | 1 | 1 | 1 | 0 | 0 | 1 | 0 |
| 1 | 0 | 1 | 1 | 0 | 0 | 0 | 1 |
| 0 | 1 | 1 | 1 | 1 | 0 | 1 | 0 |
| 0 | 1 | 1 | 1 | 0 | 1 | 0 | 0 |
| 1 | 0 | 0 | 0 | 1 | 0 | 0 | 1 |

TABLE 3-1-continued

| ASCII | | | | | | | |
|---|---|---|---|---|---|---|---|
| 73 | 6D | 6F | 6F | 74 | 68 | 65 | 72 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |

Take a plurality of blocks: Set all positions in a block to 1 and the fixing point of each block to (1, 1).

Take a plurality of shift points: Taking "Yourlips" for example, its ASCII code is 59 6F 75 72 6C 69 70 73, and 3 is truncated, which can be represented by an octal number system to form 26 26 75.65 34 46 61 51 34 07, and in turned converted as shown in Table 3-2 to obtain 10 shift points.

TABLE 3-2

| | ASCII | | | | | | | | | |
|---|---|---|---|---|---|---|---|---|---|---|
| | 26 | 26 | 75 | 65 | 34 | 46 | 61 | 51 | 34 | 07 |
| Row | 3 | 3 | 8 | 7 | 4 | 5 | 7 | 6 | 4 | 1 |
| Column | 7 | 7 | 6 | 6 | 5 | 7 | 2 | 2 | 5 | 8 |

Take a plurality of diffused encryption times: set each diffused encryption times as 1.

Encryption Process:

1. Take out a shift point and a block in sequence.

2. The diffused area is labeled as the shift point.

3. The fixing point of the block is set to the shift point, and the block is set to the position of a diffused start block.

4. The diffused start block is uses as a center, and the diffused areas are neatly arranged according to their block size.

5. A block size is used as a unit to carry out a two-dimensional matrix diffused operation.

Description: The first shift point (3, 7) is taken out, and its row value is 3 and column value is 7. Take out the first block and move it to that position, so that the upper left corner and the lower right corner of the diffused start block can be represented by (3,7)(4,8). The diffused start block is the center, and the diffused area is divided by blocks to obtain the top, down, left and right blocks which are represented by their upper left corner and lower left corner pairs (1,7)(2,8), (5,7)(6,8), (3,5)(4,6) and (3,9)(4,10) respectively. The diffused start block is used as the center to carry out a two-dimensional matrix diffused operation. The binary table for encrypted plaintexts is shown in Table 3-3.

TABLE 3-3

| 0 | 1 | 0 | 0 | 0 | 0 | 0 | 0 |
|---|---|---|---|---|---|---|---|
| 0 | 0 | 0 | 0 | 0 | 0 | 0 | 1 |
| 1 | 0 | 0 | 1 | 0 | 0 | 0 | 1 |
| 1 | 0 | 1 | 0 | 0 | 1 | 1 | 1 |
| 1 | 1 | 0 | 1 | 0 | 1 | 1 | 1 |
| 0 | 1 | 1 | 1 | 0 | 1 | 1 | 1 |
| 1 | 0 | 0 | 0 | 1 | 0 | 1 | 0 |
| 1 | 1 | 1 | 1 | 1 | 1 | 1 | 1 |

The second shift point (3,7) is taken out, and the second block is encrypted until all shift points and blocks are taken out. The process is repeated until the encryption is completed. The binary table for ciphertexts is shown in Table 3-4.

TABLE 3-4

| 0 | 1 | 0 | 1 | 1 | 0 | 0 | 0 |
|---|---|---|---|---|---|---|---|
| 0 | 1 | 1 | 0 | 0 | 1 | 1 | 1 |
| 1 | 0 | 1 | 0 | 0 | 1 | 1 | 1 |
| 1 | 0 | 0 | 1 | 1 | 0 | 1 | 0 |
| 0 | 1 | 0 | 1 | 0 | 0 | 0 | 0 |
| 1 | 0 | 1 | 1 | 0 | 1 | 0 | 1 |
| 1 | 0 | 1 | 0 | 1 | 0 | 1 | 1 |
| 1 | 1 | 1 | 1 | 1 | 0 | 0 | 1 |

The decryption of a ciphertext is the similar to the encryption of a plaintext. In the previous example, an 8×8 two-dimensional matrix plaintext and a 2×2 matrix block are used. The new value and the original value of the diffused start block are different. The computed cycle is 8 times. Since the diffused encryption times is set to 1, therefore the diffused decryption times is set to 7. In a decryption, the last shift point and block are taken out until the first shift point and block are taken out. All shift points and blocks are taken out, and the decryption process is repeated for 7 times to obtain the original plaintext.

Example 2

Shift Point+Frame+Two-Dimensional Matrix

A plaintext takes an 8×8 two-dimensional matrix.

A frame takes a 7×7 two-dimensional matrix, and the end point and the fixing point take the coordinates (row, column) of a two-dimensional matrix.

A shift point takes the coordinates (row, column) of a two-dimensional matrix.

A diffused encryption frequency is represented by a number of times.

Initialization:

Take a plaintext which is the same as Table 3-1.

Take a plurality of frames: Set the middle position of each frame as the fixing point, and the positions of four corners s as the end points.

Take a plurality of shift points: In an 8×8 two-dimensional matrix plaintext, the positions of a 16×16 two-dimensional matrix is selected. Taking "Yourlips" for example, its ASCII code is 59 6F 75 72 6C 69 70 73, which can be converted into Table 4-1 to obtain 8 shift points.

TABLE 4-1

| | ASCII | | | | | | | |
|---|---|---|---|---|---|---|---|---|
| | 59 | 6F | 75 | 72 | 6C | 69 | 70 | 73 |
| Row | 6 | 7 | 8 | 8 | 7 | 7 | 8 | 8 |
| Column | 10 | 16 | 6 | 3 | 13 | 10 | 1 | 4 |

Take a plurality of diffused encryption times: Set each diffused encryption times as 1.

Encryption Process:

1. Take a 22×22 two-dimensional zero matrix and encrypt the plaintext to be build at the central block to define a diffused area.

2. Take out a shift point and a frame in sequence.

3. Each of the shift points for both row and column adds a value of 3, and the diffused area marks that particular position.

4. The fixing point of the frame is set to that position and divided into 4 diffused sub-areas overlapped at the fixing point.

5. Each end point of the frame is a diffused start point. In the meantime, a two-dimensional matrix diffused operation is carried out.

6. Perform XOR on each diffused value diffused to the overlapped position.

7. Take out the middle block (Row 8~15, Column 8~15) from the diffused area as the encrypted plaintext for the next time.

Description: Take out the first shift point (6,10), and its row has a value of 6 and its column has a value of 10. Take out the first frame, and move the fixing point to the diffused area (9, 13) to be divided into four diffused sub-areas which are represented by the upper left corner and the lower right corner pair (1,1)(9,13), (1,13)(9,22), (9,1)(22,13) and (9,13)(22,22) respectively. The end points (6,10), (6,16), (12,10), (12,16) of the frame are diffused start points. The new value and the original value of the diffused start point are different, and each diffused start point is used as a center. In the meantime, a two-dimensional matrix diffused operation is carried out and XOR is diffused to each diffused values at the overlapped position, the binary table of the encrypted plaintext taken out is shown in Table 4-2.

TABLE 4-2

| 0 | 0 | 1 | 0 | 1 | 1 | 1 | 0 |
| 0 | 1 | 1 | 0 | 0 | 0 | 1 | 1 |
| 1 | 1 | 0 | 1 | 0 | 1 | 1 | 0 |
| 0 | 0 | 1 | 0 | 0 | 1 | 0 | 1 |
| 1 | 0 | 1 | 0 | 1 | 1 | 1 | 1 |
| 1 | 0 | 1 | 0 | 1 | 1 | 0 | 0 |
| 1 | 1 | 0 | 1 | 1 | 0 | 1 | 0 |
| 1 | 1 | 1 | 1 | 1 | 1 | 1 | 1 |

The second shift point (7,16) is taken out and the second frame is encrypted until all shift points and frames are taken out and the encryption cycle is completed. The binary table for the ciphertext is shown in Table 4-3.

TABLE 4-3

| 0 | 1 | 0 | 0 | 1 | 0 | 1 | 1 |
| 0 | 1 | 0 | 1 | 0 | 0 | 0 | 1 |
| 0 | 0 | 1 | 0 | 0 | 0 | 1 | 1 |
| 1 | 0 | 0 | 1 | 0 | 1 | 1 | 0 |
| 0 | 0 | 1 | 1 | 1 | 0 | 1 | 1 |
| 0 | 1 | 0 | 1 | 0 | 0 | 0 | 1 |
| 1 | 0 | 1 | 0 | 0 | 1 | 0 | 1 |
| 1 | 0 | 0 | 0 | 1 | 1 | 0 | 0 |

The decryption process of the ciphertext is similar to the encryption process of the plaintext. In the previous example, an 8×8 two-dimensional matrix plaintext is diffused, and the new value and the original value of the diffused start point are different. The computed cycle is 16 times. Since the diffused encryption times is set to 1, therefore the diffused decryption times is set to 15. In the decryption, the last shift point and frame are taken out until the first shift point and frame are taken out. All shift points and frames are taken out, and the decryption process is repeated for 15 times to obtain the original plaintext.

Example 3

Shift Point+Frame+Three-Dimensional Matrix

A plaintext takes a 8×8×8 three-dimensional matrix.

A frame takes a 7×7×7 three-dimensional matrix, and the end point and the fixing point take the coordinates ($1^{st}$ dimension, $2^{nd}$ dimension, $3^{rd}$ dimension) of a three-dimensional matrix.

A shift point takes the coordinates ($1^{st}$ dimension, $2^{nd}$ dimension, $3^{rd}$ dimension) of a three-dimensional matrix.

A diffused encryption frequency is represented by a number of times.

Initialization:

Take a plaintext: Taking "smoother" for example, it is repeated for 8 times. In other words, the 8×8 two-dimensional matrix of the previous example is overlapped for 8 times to form a binary 8×8×8 three-dimensional matrix as shown in Table 5-1 which is represented by ASCII codes and an 8×8 two-dimensional matrix.

TABLE 5-1

| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |
| 73 | 6D | 6F | 6F | 74 | 68 | 65 | 72 |

Take a plurality of frame: Set the middle position of each frame as the fixing point, and the 8 corner position are set as end points.

Take a plurality of shift point: In an 8×8×8 three-dimensional matrix plaintext, a 16×16×16 three-dimensional matrix position is selected. Taking "YourlipsY" for example, its ASCII code is 59 6F 75 72 6C 69 70 73 59, which can be converted into Table 5-2, and 6 shift points are taken.

TABLE 5-2

| | ASCII | | | | | |
| --- | --- | --- | --- | --- | --- | --- |
| | 596 | F75 | 726 | C69 | 707 | 359 |
| First Dimension | 6 | 16 | 8 | 13 | 8 | 4 |
| Second Dimension | 10 | 8 | 3 | 7 | 1 | 6 |
| Third Dimension | 7 | 6 | 7 | 10 | 8 | 10 |

Take a plurality of diffused encryption times: Set each diffused encryption times to 1.

Encryption process: It has the same encryption process as described in Example 2, and its two-dimensional settings are changed to three-dimensional settings.

Description: The first shift point (6,10,7) is taken out. The value of the first dimension is 6; the value of the second dimension is 10; and the value of the third dimension is 7. The first frame is taken out, and the fixing point is moved to the diffused area (9,13,10). Since the frame has 8 end points, therefore it is divided into 8 diffused sub-areas, and each end point is a diffused start point. The new value and the original value of the diffused start point are set to different, and each diffused start point is a center. In the meantime, a three-dimensional matrix diffused operation is carried out to diffuse XOR to each diffused value at the superimposed position. The second shift point (16,8,6) is taken out, and the second frame is encrypted until all shift points and frames are taken out and the cycle encryption is completed. The binary table for the ciphertext is represented by ASCII codes ad an 8×8 two-dimensional matrix as shown in Table 5-3.

TABLE 5-3

| 33 | 2C | CC | AC | A0 | 52 | 13 | 66 |
|----|----|----|----|----|----|----|----|
| E6 | 04 | A9 | C7 | 31 | 51 | 00 | A1 |
| FC | DB | 23 | 57 | 7B | 85 | CE | 95 |
| 87 | DE | 13 | 3B | 6E | CE | 16 | DA |
| B8 | FE | 88 | 18 | 19 | D6 | B0 | DF |
| 10 | 14 | F5 | 2A | DE | 7B | C1 | C2 |
| 29 | B2 | C5 | C8 | 63 | B3 | 40 | 60 |
| AB | FA | CE | 76 | A9 | C4 | 0A | AD |

In the examples, the diffused mechanism can be used either independently or jointly with more than one item, and the diffused operation can be established for two or more dimensions. By this method, the number of points of the multipoint synchronous diffusion is increased by multiples if the plaintext is increased by one dimension. Further, the multipoint setting is indicated by the dotted line section as shown in FIG. 1, and the further setting of its block includes the block value, the element combination and the fixing point. The further setting of its frame includes the end point and the fixing point. All further settings can be taken as a plurality of different values for the embodiments. Therefore, a cipher with a combination of much more digits can be formed during the process of executing the diffused operation.

The cipher having much more digits can be used in a serial input and as a unit according to the diffused mechanism combination. The cipher is divided into a plurality of units, and a plaintext can be encrypted by the diffused mechanism combination together with a unit and then encrypted again with another diffused mechanism combination together with another unit, and so on and so forth. The cipher having much more digits also can be established in the parallel input. In the process, the same diffused mechanism combination is used, and the individual setting of the combination is used as a unit to divide the cipher into a plurality of units. All units are inputted at the same time and read in sequence for encrypting the plaintext.

In summation of the above description, the present invention herein complies with the patent application requirements and is submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A symmetric encryption/decryption method, comprising steps of:
    (A) selecting a diffused mechanism, wherein said diffused mechanism uses a block $S_{k_1 \times k_2 \times \ldots \times k_n}$ as at least one dimensional matrix, and $S_{k_1 \times k_2 \times \ldots \times k_n}$ includes a fixing point and said fixing point is at least one dimensional coordinate, and said coordinate is disposed at $(i_1, i_2, \ldots, i_n)$, either inside or outside the area of a plaintext A, and moreover, $S_{k_1 \times k_2 \times \ldots \times k_n}$ is placed at a diffused start block, and said diffused start block is used as the center and said plaintext is arranged according to $S_{k_1 \times k_2 \times \ldots \times k_n}$ size, and said block size is used as an unit, such that said diffused start block is used as a center to carry out at least one dimensional diffused operation;
    (B) retrieving a plurality of bits required for a cipher according to said diffused mechanism and the element numbers of each dimension of a said plaintext;
    (C) performing a diffused operation $A(i_1, i_2, \ldots, i_n)$ according to said diffused mechanism in terms of said plurality of bits; and
    (D) repeating Steps (B) to (C) for a first number of predetermined times so as to convert said plaintext into a ciphertext and achieve effect of encrypting said plaintext.

2. The symmetric encryption/decryption method of claim 1, wherein said encryption/decryption method converts said ciphertext into at least one dimensional matrix and reversely read the cipher of said cipher to carry out $A(i_1, i_2, \ldots, i_n)$ repeatedly for a second number of predetermined times for said ciphertext and achieve the effect of encrypting and decrypting said ciphertext; wherein a sum of the first number of predetermined times and the second number of predetermined times equal to a diffused cycle.

3. The symmetric encryption/decryption method of claim 1, wherein said cipher is each dimension element number of a plurality of blocks.

4. The symmetric encryption/decryption method of claim 1, wherein said cipher is a plurality of block values.

5. The symmetric encryption/decryption method of claim 1, wherein said cipher refers to fixing points of a plurality of blocks.

6. A symmetric encryption/decryption method, comprising steps of:
    (A) selecting a diffused mechanism, wherein said diffused mechanism uses a frame $W_{k_1 \times k_2 \times \ldots \times k_n}$ as the space configuration of at least one dimensional matrix and uses a plurality of end points obtained from $W_{k_1 \times k_2 \times \ldots \times k_n}$ perimeter intersected position, and said end point is at least one dimensional coordinate; and $W_{k_1 \times k_2 \times \ldots \times k_n}$ comprises a fixing point, and said fixing point is at least one dimensional coordinate, and said coordinate is disposed at $(i_1, i_2, \ldots, i_n)$ either inside or outside the area of a plaintext A;
    (B) retrieving a plurality of bits required for a cipher according to said diffused mechanism and the element numbers of each dimension of said plaintext;
    (C) performing a diffused operation $A(i_1, i_2, \ldots, i_n)$ according to said diffused mechanism in terms of said plurality of bits; and
    (D) repeating Steps (B) to (C) for a first number of predetermined times so as to convert said plaintext into a ciphertext and achieve effect of encrypting said plaintext.

7. The symmetric encryption/decryption method of claim 6, wherein said plurality of end points of $W_{k_1 \times k_2 \times \ldots \times k_n}$ is a plurality of diffused staff points; said plaintext is divided by a plurality of sub-areas overlapped at said fixing point of $W_{k_1 \times k_2 \times \ldots \times k_n}$, and said each sub-area includes said diffused staff point, and said plurality of diffused staff points is used as a center to simultaneously carry out at least one dimensional diffused operation and diffuses an XOR to each diffused value at said overlapped position.

8. The symmetric encryption/decryption method of claim 7, wherein said coordinate of said end point can be changed within said sub-area.

9. The symmetric encryption/decryption method of claim 6, wherein said cipher refers to end points of a plurality of frames.

10. The symmetric encryption/decryption method of claim 6, wherein said cipher refers to fixing points of a plurality of frames.

11. The symmetric encryption/decryption method of claim 6, wherein said encryption/decryption method converts said ciphertext into at least one dimensional matrix and reversely read the cipher of said cipher to carry out $A(i_1, i_2, \ldots, i_n)$ repeatedly for a second number of predetermined times for said ciphertext and achieve the effect of encrypting and decrypting said ciphertext; wherein a sum of the first number of predetermined times and the second number of predetermined times equal to a diffused cycle.

12. A symmetric encryption/decryption method, comprising steps of:

(A) selecting a diffused mechanism, wherein said diffused mechanism adopts a frame $W_{k_1 \times k_2 \times \ldots \times k_n}$ with a plurality of blocks, and a fixing point of each block $S_{k_1 \times k_2 \times \ldots \times k_n}$ is placed at an end point of $W_{k_1 \times k_2 \times \ldots \times k_n}$, and a plurality of diffused start blocks is disposed at the $S_{k_1 \times k_2 \times \ldots \times k_n}$ position, and a fixing point of a non-working block is placed at a fixing point of $W_{k_1 \times k_2 \times \ldots \times k_n}$ as a fixing block, and said fixing point is disposed at $(i_1, i_2, \ldots, i_n)$, either inside or outside the area of a plaintext A, and said plaintext is divided into a plurality of sub-areas overlapped by said fixing blocks of $W_{k_1 \times k_2 \times \ldots \times k_n}$, and said each sub-area includes a said diffused start block, and said plurality of diffused start blocks is used as a center to simultaneously execute at least one dimensional diffused operation and diffuses XOR to said each diffused value at said overlapped position;

(B) retrieving a plurality of bits required for a cipher according to said diffused mechanism and the element numbers of each dimension of said plaintext;

(C) performing a diffused operation $A(i_1, i_2, \ldots, i_n)$ according to said diffused mechanisms in terms of said plurality of bits; and (D) repeating Steps (B) to (C) for a first number of predetermined times so as to convert said plaintext into a ciphertext and achieve effect of encrypting said plaintext.

13. The symmetric encryption/decryption method of claim 12, wherein said encryption/decryption method converts said ciphertext into at least one dimensional matrix and reversely read the cipher of said cipher to carry out $A(i_1, i_2, \ldots, i_n)$ repeatedly for a second number of predetermined times for said ciphertext and achieve the effect of encrypting and decrypting said ciphertext; wherein a sum of the first number of predetermined times and the second number of predetermined times equal to a diffused cycle.

* * * * *